United States Patent
Lu et al.

(10) Patent No.: US 9,971,396 B2
(45) Date of Patent: May 15, 2018

(54) METHOD FOR PERFORMING SYSTEM POWER CONTROL WITHIN AN ELECTRONIC DEVICE, AND ASSOCIATED APPARATUS

(71) Applicant: MEDIATEK INC., Hsin-Chu (TW)

(72) Inventors: Chia-Lin Lu, Kaohsiung (TW); Hui-Hsuan Wang, Taoyuan (TW); I-Pu Niu, Taichung (TW); Yu-Chung Chang, Hsinchu County (TW); Jia-Horng Shieh, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 78 days.

(21) Appl. No.: 14/785,350

(22) PCT Filed: Mar. 27, 2015

(86) PCT No.: PCT/CN2015/075211
§ 371 (c)(1),
(2) Date: Oct. 19, 2015

(87) PCT Pub. No.: WO2015/144085
PCT Pub. Date: Oct. 1, 2015

(65) Prior Publication Data
US 2016/0054776 A1     Feb. 25, 2016

Related U.S. Application Data

(60) Provisional application No. 61/971,896, filed on Mar. 28, 2014.

(51) Int. Cl.
*G06F 1/00* (2006.01)
*G06F 1/32* (2006.01)
(Continued)

(52) U.S. Cl.
CPC ............... *G06F 1/329* (2013.01); *G06F 1/10* (2013.01); *G06F 1/3206* (2013.01);
(Continued)

(58) Field of Classification Search
CPC ... G06F 1/324; G06F 1/10; G06F 1/32; G06F 1/3206; G06F 1/206; G06F 1/3296; Y02B 60/1217; Y02B 60/1275; Y02B 60/1292
(Continued)

(56) References Cited

U.S. PATENT DOCUMENTS

| | | | |
|---|---|---|---|
| 6,513,124 B1 * | 1/2003 | Furuichi | G06F 1/3228 713/322 |
| 7,174,469 B2 | 2/2007 | Luick | |

(Continued)

FOREIGN PATENT DOCUMENTS

| | | |
|---|---|---|
| CN | 101227672 A | 7/2008 |
| CN | 102096460 A | 6/2011 |

(Continued)

OTHER PUBLICATIONS

"International Search Report" dated Jun. 23, 2015 for International application No. PCT/CN2015/075220, International filing date:Mar. 27, 2015.

(Continued)

*Primary Examiner* — Nitin Patel
(74) *Attorney, Agent, or Firm* — Winston Hsu

(57) ABSTRACT

A method for performing system power control within an electronic device and an associated apparatus are provided. The method includes the steps of: utilizing a power consumption index generator positioned in a specific subsystem to generate a power consumption index corresponding to the specific subsystem, where the electronic device includes a plurality of subsystems, and the specific subsystem is one of the plurality of subsystems; and triggering a power limiter (Continued)

protection operation for the electronic device according to the power consumption index. For example, the power consumption index corresponding to the specific subsystem may represent a power consumption value of the specific subsystem, and the method may further include: comparing the power consumption value of the specific subsystem with a peak power threshold to determine whether the power consumed by the specific subsystem reaches the peak power threshold to generate a determining result, for triggering the power limiter protection operation.

18 Claims, 11 Drawing Sheets

(51) Int. Cl.
*G06F 1/10* (2006.01)
*G06F 1/20* (2006.01)

(52) U.S. Cl.
CPC ............ *G06F 1/3228* (2013.01); *G06F 1/206* (2013.01); *G06F 1/324* (2013.01); *G06F 1/3212* (2013.01); *G06F 1/3296* (2013.01); *Y02B 60/1217* (2013.01); *Y02B 60/1275* (2013.01); *Y02B 60/1292* (2013.01)

(58) Field of Classification Search
USPC ......................................................... 713/322
See application file for complete search history.

(56) References Cited

U.S. PATENT DOCUMENTS

| | | | | |
|---|---|---|---|---|
| 2006/0129852 A1* | 6/2006 | Bonola | ................. | G06F 1/3203 713/300 |
| 2006/0156042 A1 | 7/2006 | Desai | | |
| 2006/0282685 A1* | 12/2006 | Bahali | ................... | G06F 1/3203 713/300 |
| 2007/0049133 A1 | 3/2007 | Conroy | | |
| 2007/0124094 A1* | 5/2007 | Brey | ..................... | G06F 1/3203 702/60 |
| 2008/0244311 A1 | 10/2008 | Elliott | | |
| 2009/0125293 A1 | 5/2009 | Lefurgy | | |
| 2011/0053656 A1 | 3/2011 | Plestid | | |
| 2012/0005513 A1 | 1/2012 | Brock | | |
| 2013/0046997 A1 | 2/2013 | Callaway | | |
| 2013/0155073 A1 | 6/2013 | Khodorkovsky | | |
| 2013/0159755 A1* | 6/2013 | Presant | ................... | G06F 1/206 713/340 |
| 2013/0219203 A1 | 8/2013 | Fujisaki | | |
| 2013/0227261 A1* | 8/2013 | Anderson | ............. | G06F 9/4401 713/2 |
| 2013/0311803 A1 | 11/2013 | Wang | | |
| 2014/0006818 A1* | 1/2014 | Doshi | ................... | G06F 1/3203 713/320 |
| 2014/0089688 A1* | 3/2014 | Man | ...................... | G06F 1/3206 713/300 |
| 2015/0227397 A1 | 8/2015 | Gogula | | |

FOREIGN PATENT DOCUMENTS

| | | |
|---|---|---|
| CN | 103220435 A | 7/2013 |
| EP | 2 658 231 A1 | 10/2013 |

OTHER PUBLICATIONS

"International Search Report" dated Jul. 3, 2015 for International application No. PCT/CN2015/075211, International filing date:Mar. 27, 2015.

* cited by examiner

METHOD FOR PERFORMING SYSTEM POWER CONTROL WITHIN AN ELECTRONIC DEVICE, AND ASSOCIATED APPARATUS

CROSS REFERENCE TO RELATED APPLICATIONS

This application claims the benefit of U.S. Provisional Application No. 61/971,896, which was filed on Mar. 28, 2014, and is included herein by reference.

FIELD OF INVENTION

The present invention relates to power consumption control of a system comprising multiple subsystems, and more particularly, to a method for performing system power control within an electronic device, and an associated apparatus.

BACKGROUND OF THE INVENTION

A conventional portable electronic device, such as a mobile phone, a wearable device, a tablet, etc., may suffer from the peak power consumption and the peak thermal impact problems (e.g. due to high instantaneous power consumption), where the peak power consumption may hurt the battery life of the conventional portable electronic device and may cause the system thereof to be unstable, and the unacceptable peak thermal impact may be dangerous to the user of the conventional portable electronic device. For example, when the battery of the conventional portable electronic device is full (e.g. the remaining battery power is around 100%), the battery supply voltage may be around 4.3 Volts (V), while in most cases, the battery supply voltage may be kept greater than or equal to 3.8 V. Under these operation conditions, the battery has more tolerance to peak power. But, when the battery supply voltage starts to drop (e.g. the battery supply voltage may be less than 3.8 V), the tolerance to peak power is getting worse, and therefore, any peak power may cause the system failure.

According to the related art, some conventional methods are proposed in order to solve the above problems. For example, one of the conventional methods may comprise using embedded thermal sensor for thermal shut-down decision. Another of the conventional methods may comprise passively monitoring the peak current-resistance (IR) drop (e.g. the peak voltage drop across a current-sensing resistance) with a limited sampling rate. However, further problems may be introduced. For example, the conventional methods measure results brought by peak power, thus are reactive but not proactive and may have poor response time. In addition, monitoring the peak IR drop may be inaccurate, resulting in greater and greater hardware area overhead to improve accuracy. Additionally, the sampling rate is typically limited, and therefore, it is hard to monitor at a full speed. Thus, a novel architecture is required for enhancing the system power management with fewer side effects.

SUMMARY OF THE INVENTION

It is therefore an objective of the claimed invention to provide a method for performing system power control within an electronic device, and an associated apparatus, in order to solve the above-mentioned problems.

It is another objective of the claimed invention to provide a method for performing system power control within an electronic device, and an associated apparatus, in order to utilize the electric energy available from a battery of the electronic device as much as possible.

It is another objective of the claimed invention to provide a method for performing system power control within an electronic device, and an associated apparatus, in order to utilize the electric energy available from a battery of the electronic device as much as possible and avoid unintentional shutdown of the electronic device.

According to at least one preferred embodiment, a method for performing system power control within an electronic device is provided, where the method can be applied to at least one portion (e.g. a portion or all) of the electronic device. The method comprises the steps of: utilizing a power consumption index generator positioned in a specific subsystem to generate a power consumption index corresponding to the specific subsystem, wherein the electronic device comprises a plurality of subsystems, and the specific subsystem is one of the plurality of subsystems; and triggering a power limiter protection operation for the electronic device according to the power consumption index.

According to at least one preferred embodiment, an apparatus for performing system power control within an electronic device is also provided, where the apparatus may comprise at least one portion (e.g. a portion or all) of the electronic device, and the electronic device may comprise a plurality of subsystems. The apparatus comprises a power consumption index generator positioned in a specific subsystem of the plurality of subsystems, and comprises a processing circuit (e.g. at least one processor, or at least one controller) that is coupled to the power consumption index generator. More particularly, the power consumption index generator is capable of generating a power consumption index corresponding to the specific subsystem. In addition, the processing circuit is capable of triggering a power limiter protection operation for the electronic device according to the power consumption index. For example, at least one portion (e.g. a portion or all) of the processing circuit may be integrated into one or more of the plurality of subsystems. In another example, the processing circuit may be positioned outside the plurality of subsystems.

It is an advantage of the present invention that the present invention method and the associated apparatus can enhance the overall performance of the electronic system with fewer side effects. In addition, the present invention method and the associated apparatus can perform system power budgeting in a proactive manner. For example, a power consumption index generator (e.g. a digital power consumption index generator) and a power limiter protection operation (may be implemented by hardware, software, firmware or a combination thereof) may be utilized to manage the system power (or battery) budget and the system temperature. Instead of reactive indicators such as generated heat or IR drop, the power consumption index generator can be placed in at least one subsystem of the electronic device to indicate the power consumption of the subsystem, so that the power consumption can be managed proactively. Besides, multiple kinds of power control schemes may be performed to reduce or eliminate peak power. As a result, the goal of fine-grained thermal control (more particularly, throttling) and adaptive battery resource allocation may be achieved. Additionally, in comparison with the related art such as a conventional architecture operates in a reactive manner, the present invention method and the associated apparatus can prevent the related art problems.

These and other objectives of the present invention will no doubt become obvious to those of ordinary skill in the art

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
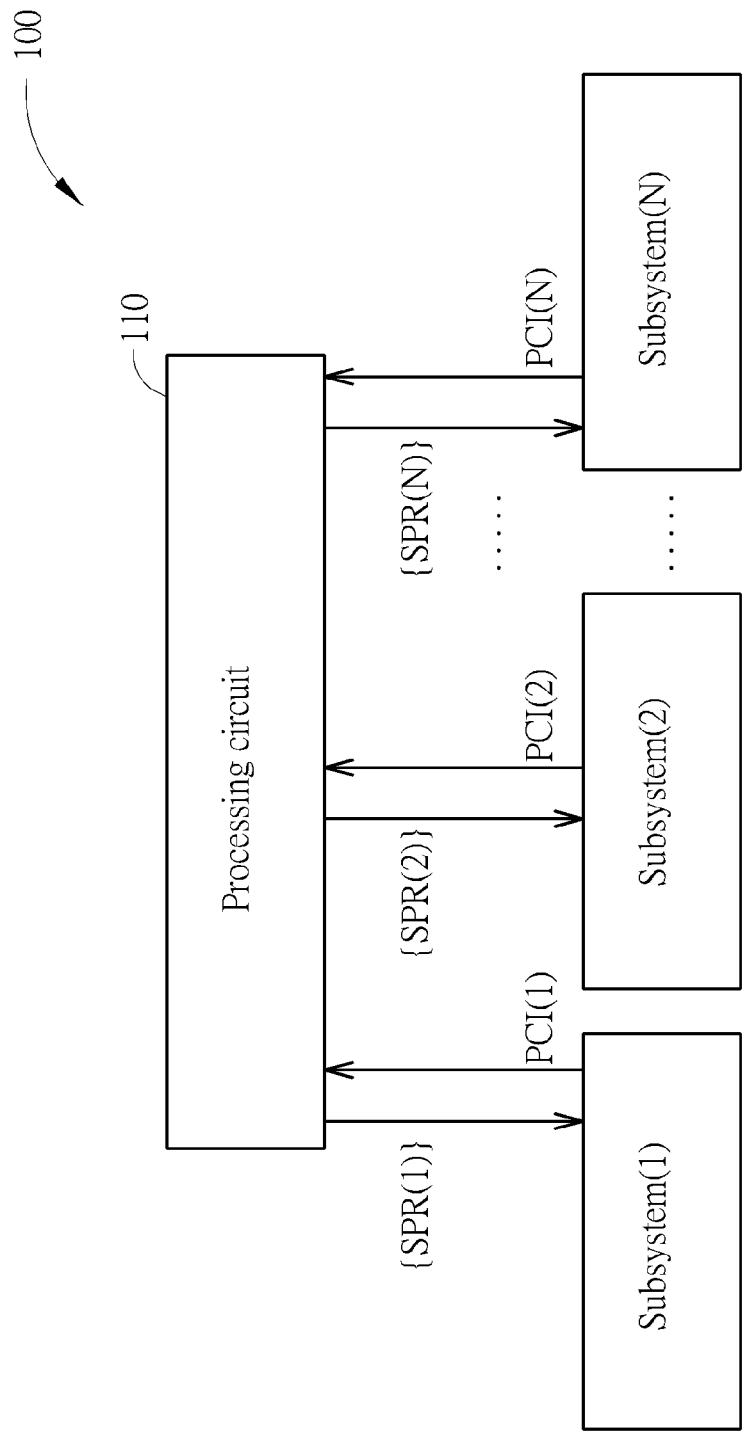
FIG. 1 is a diagram of an apparatus for performing system power control within an electronic device according to an embodiment of the present invention.

FIG. 1 is a diagram of an apparatus 100 for performing system power control within an electronic device according to an embodiment of the present invention, where the apparatus 100 may comprise at least one portion (e.g. a portion or all) of the electronic device. The apparatus 100 may comprise a portion of the electronic device mentioned above, and for example, can be at least one hardware circuitry such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), a tablet, a wearable device, and a personal computer such as a laptop computer.

According to this embodiment, the electronic device may comprise a plurality of subsystems, such as a set of subsystems Subsystem(1), Subsystem(2), . . . , and Subsystem(N) shown in FIG. 1, where the notation N may represent a positive integer that is greater than or equal to one, and therefore the number of subsystems within the set of subsystems Subsystem(1), Subsystem(2), . . . , and Subsystem(N) may be greater than or equal to one. The apparatus 100 may comprise a processing circuit 110 (e.g. at least one processor, or at least one controller) that is coupled to power consumption index generator(s) positioned in the subsystem(s). As mentioned above, shown in FIG. 1, the apparatus 100 may comprise at least one portion (e.g. a portion or all) of the electronic device, and therefore, the set of subsystems Subsystem(1), Subsystem(2), . . . , and Subsystem(N) can be illustrated within the apparatus 100, for better comprehension. This is for illustrative purposes only, and is not meant to be a limitation of the present invention. In general, one or more of the set of subsystems Subsystem(1), Subsystem(2), . . . , and Subsystem(N) can be illustrated outside the apparatus 100. For some examples, all of the set of subsystems Subsystem(1), Subsystem(2), . . . , and Subsystem(N) can be illustrated outside the apparatus 100.

In the architecture shown in FIG. 1, the processing circuit 110 is positioned outside the set of subsystems Subsystem(1), Subsystem(2), . . . , and Subsystem(N). For example, in a situation where the plurality of subsystems is equivalent to the set of subsystems Subsystem(1), Subsystem(2), . . . , and Subsystem(N), the processing circuit 110 is positioned outside the plurality of subsystems. This is for illustrative purposes only, and is not meant to be a limitation of the present invention. According to some embodiments of the present invention, at least one portion (e.g. a portion or all) of the processing circuit 110 may be integrated into one or more of the plurality of subsystems. For one example, one or more of the subsystems Subsystem(1), Subsystem(2), . . . , and Subsystem(N) may contain a portion or all of the processing circuit 110. For another example, in addition to the set of subsystems Subsystem(1), Subsystem(2), . . . , and Subsystem(N), the plurality of subsystems may further comprise a subsystem Subsystem(0), and the processing circuit 110 may be integrated into the subsystem Subsystem(0).

No matter whether the processing circuit 110 is positioned outside the plurality of subsystems or is partially or fully integrated into one of the plurality of subsystems, the plurality of subsystems may comprise hardware circuits, and the apparatus 100 may comprise a power consumption index generator that is positioned in a specific subsystem of the plurality of subsystems, where the processing circuit 110 is coupled to the power consumption index generator. The power consumption index generator is capable of generating a power consumption index corresponding to the specific subsystem. In addition, the processing circuit 110 may be capable of, based on the power consumption index corresponding to the specific subsystem, triggering a power limiter protection operation for the electronic device, where the power consumption index corresponding to the specific subsystem may indicate whether triggering the power limiter protection operation is required. For example, in a situation where the power consumption index corresponding to the specific subsystem indicates that the power limiter protection operation is required, the processing circuit 110 may trigger the power limiter protection operation for the electronic device. In another example, in a situation where the power consumption index corresponding to the specific subsystem indicates that the power limiter protection operation is not required, the processing circuit 110 may not trigger the power limiter protection operation for the electronic device.

In one embodiment, each subsystem of the plurality of subsystems, such as the subsystem(n), may comprise a power consumption index generator PCIG(n) that is capable of generating a power consumption index PCI(n) corresponding to this subsystem Subsystem(n), no matter whether the index n falls within the range of the interval[0, N] or falls within the range of the interval[1, N]. For example, the power consumption index generator PCIG(n) may generate the power consumption index PCI(n) according to at least one model (e.g. one or more models) and/or according to at least one condition (e.g. one or more conditions) of the subsystem(n). The model(s) may refer to an equation to calculate power consumption, a table to record power consumption of component(s), a power meter to measure power consumption, etc. In addition, the processing circuit 110 may be capable of triggering the power limiter protection operation for the electronic device according to at least one portion (e.g. a portion or all) of the power consumption indexes {PCI(n)} respectively corresponding to the subsystems {Subsystem(n)}, such as the power consumption indexes PCI(1), PCI(2), . . . , and PCI(N) respectively corresponding to the set of subsystems Subsystem(1), Subsystem(2), . . . , and Subsystem(N).

In one embodiment, the processing circuit 110 may utilize at least one software programmable register SPR or at least one set of software programmable registers {SPR} to control the operation of generating the power consumption index PCI(n) in at least one subsystem such as the subsystem Subsystem(n). For example, the value(s) stored in software programmable register(s) SPR may comprise parameter(s) (and/or coefficient(s)) for controlling the aforementioned at least one model, and therefore the operation of generating the power consumption index PCI(n) in at least one subsystem Subsystem(n) may vary in response to the value(s) stored in the software programmable register(s) SPR, and may be enhanced by adjusting at least one portion (e.g. a portion or all) of the value(s) stored in the at least one software programmable register SPR or at least one set of software programmable registers {SPR}.

For example, the processing circuit 110 may write/update values in N sets of software programmable registers {SPR (1)}, {SPR(2)}, . . . , and {SPR(N)} in the subsystems Subsystem(1), Subsystem(2), . . . , and Subsystem(N), respectively, to control the operations of generating the power consumption indexes PCI(1), PCI(2), . . . , and PCI(N) in the subsystems Subsystem(1), Subsystem(2), . . . , and Subsystem(N), respectively. This is for illustrative purposes only, and is not meant to be a limitation of the present invention. According to some embodiments of the present invention, in a situation where the plurality of subsystems further comprises the subsystem Subsystem(0) and at least one portion (e.g. a portion or all) of the processing circuit 110 is integrated into the subsystem Subsystem(0), the processing circuit 110 may utilize (N+1) sets of software programmable registers {SPR(0)}, {SPR(1)}, . . . , and {SPR(N)} to control the operations of generating the power consumption indexes PCI(0), PCI(1), . . . , and PCI(N) in the subsystems Subsystem(0), Subsystem(1), . . . , and Subsystem(N), respectively.

In the embodiment shown in FIG. 1, the apparatus 100 may comprise a plurality of subsystems such as the set of subsystems Subsystem(1), Subsystem(2), . . . , and Subsystem(N). This is for illustrative purposes only, and is not meant to be a limitation of the present invention. According to some embodiments of the present invention, it is unnecessary that the whole of the set of subsystems Subsystem(1), Subsystem(2), . . . , and Subsystem(N) is regarded as a portion of the apparatus 100. For example, the apparatus 100 of these embodiments may still comprise the processing circuit 110, and at least one portion (e.g. a portion or all) of the processing circuit 110 may be integrated into one of the plurality of subsystems, or may be positioned outside the plurality of subsystems. According to one of these embodiments, in a situation where the plurality of subsystems is equivalent to the set of subsystems Subsystem(1), Subsystem(2), . . . , and Subsystem(N), the processing circuit 110 may be positioned outside the plurality of subsystems. According to another of these embodiments, in a situation where the plurality of subsystems further comprises the subsystem Subsystem(0) (i.e. the plurality of subsystems comprises the subsystems Subsystem(0), Subsystem(1), . . . , and Subsystem(N)), at least one portion (e.g. a portion or all) of the processing circuit 110 may be integrated into the subsystem Subsystem(0).

Some implementation details regarding the aforementioned power consumption index generator PCIG(n) are described as follows. According to some embodiments, each subsystem may comprise one or more counter(s) and one or more software programmable register(s). For example, each counter within the one or more counter(s) may correspond to a predefined event that may consume power, and this counter may count the number of occurrence of this predefined event. The associated software programmable register within the one or more software programmable register(s), such as that corresponding to this counter, may store the power consumption value of this event. This is for illustrative purposes only, and is not meant to be a limitation of the present invention. According to some embodiments, a software programmable register within the one or more software programmable register(s) may store weightings of the power respectively consumed by a plurality of predefined events. For example, in a situation where the ratio of the power consumed by event A to the power consumed by event B is equivalent to two, the weighting of event A can be set as 1 and the weighting of event B can be set as 0.5. This is for illustrative purposes only, and is not meant to be a limitation of the present invention.

According to some embodiments, the aforementioned power consumption index generator PCIG(n) can be an analog current meter positioned in the subsystem Subsystem (n). According to some embodiments, the software programmable registers SPR(n) can be positioned outside the subsystem Subsystem(n).

Figure 2:
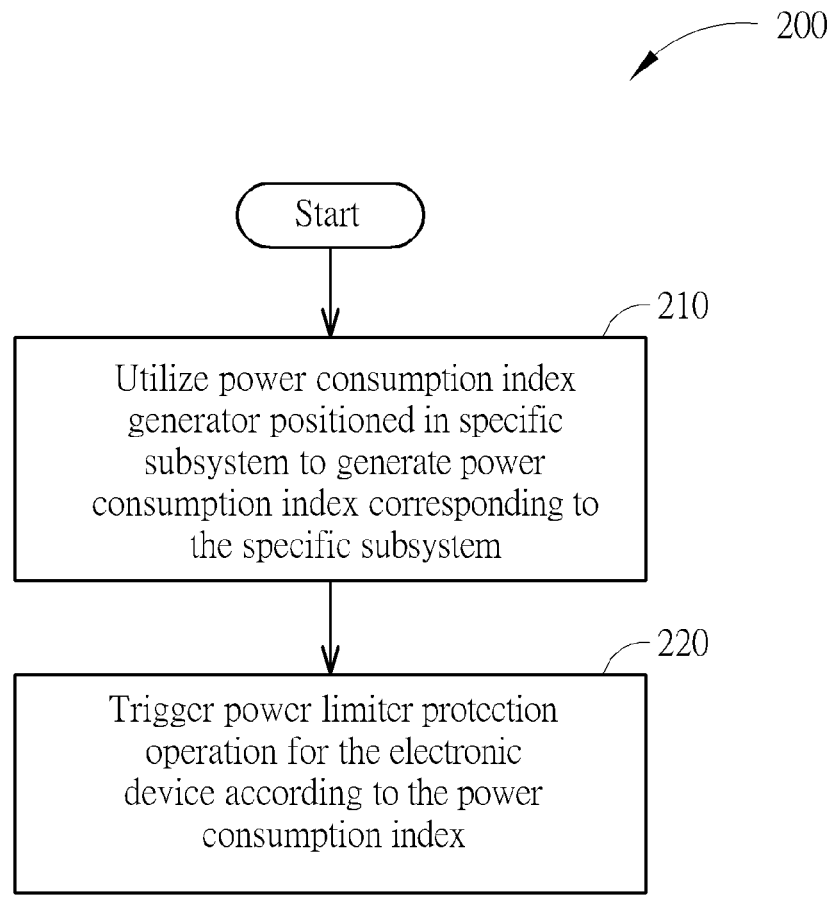
FIG. 2 illustrates a flowchart of a method for performing system power control within an electronic device according to an embodiment of the present invention.

FIG. 2 illustrates a flowchart of a method 200 for performing system power control within an electronic device according to an embodiment of the present invention. The method 200 can be applied to the apparatus 100 mentioned above (e.g. the apparatus 100 shown in FIG. 1, or the apparatus 100 of some embodiments described above), and can be applied to the processing circuit 110 therein (e.g. the processing circuit 110 shown in FIG. 1, or the processing circuit 110 in the apparatus 100 of some embodiments described above). The method can be described as follows.

In Step 210, the processing circuit 110 may utilize a power consumption index generator positioned in a specific subsystem such as that mentioned above to generate a power consumption index corresponding to the specific subsystem, where the specific subsystem mentioned in Step 210 may represent any subsystem of the plurality of subsystems. For example, in a situation where the specific subsystem represents the subsystem Subsystem(n), the processing circuit 110 may utilize the power consumption index generator PCIG(n) positioned in the subsystem Subsystem(n) to generate the power consumption index PCI(n) corresponding to the subsystem Subsystem(n), no matter whether the index n falls within the range of the interval[0, N] or falls within the range of the interval[1, N]. For example, when needed, the processing circuit 110 may utilize the power consumption index generators {PCIG(n)} respectively positioned in the subsystems {Subsystem(n)} to generate the power consumption indexes {PCI(n)} respectively corresponding to the subsystems {Subsystem(n)}.

In Step 220, the processing circuit 110 may trigger a power limiter protection operation such as that mentioned above for the electronic device according to the power consumption index mentioned in Step 210. According to some embodiments, the processing circuit 110 may determine whether the power consumed by the specific subsystem reaches a peak power threshold according to the power consumption index corresponding to the specific subsystem to generate a determining result. And the processing circuit 110 may trigger this power limiter protection operation for the electronic device according to the determining result. For example, the processing circuit 110 may trigger a power limiter protection operation when the determining result shows that the power consumed by the specific subsystem reaches the peak power threshold. For another example, the processing circuit 110 may not trigger a power limiter protection operation when the determining result shows that the power consumed by the specific subsystem reaches the peak power threshold. In one embodiment where the specific subsystem represents the subsystem Subsystem(n), the processing circuit 110 may determine whether the power consumed by the subsystem Subsystem(n) reaches the peak power threshold according to the power consumption index PCI(n) corresponding to the subsystem Subsystem(n) (no matter whether the index n falls within the range of the interval[0, N] or falls within the range of the interval[1, N]) to generate a determining result, and may trigger the power limiter protection operation for the electronic device according to the determining result. For example, while the processing circuit 110 may utilize the power consumption index generator positioned in the specific subsystem to generate the power consumption index corresponding to the specific subsystem, and the processing circuit 110 may utilize another power consumption index generator positioned in another subsystem to generate another power consumption index corresponding to the other subsystem, and may determine whether the power consumed by the specific subsystem reaches the peak power threshold according to the power consumption index corresponding to the specific subsystem and according to the other power consumption index corresponding to the other subsystem to generate a determining result, and may trigger the power limiter protection operation for the electronic device according to the determining result. For example, the processing circuit 110 may determine whether the power consumed by the specific subsystem reaches the peak power threshold in response to at least one portion (e.g. a portion or all) of the power consumption indexes {PCI(n)} respectively corresponding to the subsystems {Subsystem(n)}, no matter whether the index n falls within the range of the interval[0, N] or falls within the range of the interval[1, N], to generate the determining result.

According to some of the above embodiments, the power consumption index corresponding to the specific subsystem may represent a power consumption value of the specific subsystem, and the processing circuit 110 may compare the power consumption value of the specific subsystem with the peak power threshold to determine whether the power consumed by the specific subsystem reaches the peak power threshold to generate the determining result. This is for illustrative purposes only, and is not meant to be a limitation of the present invention. According to some embodiments of the present invention, the power consumption index corresponding to the specific subsystem may be proportional to the power consumed by the specific subsystem, and the processing circuit 110 may determine the power consumption value of the specific subsystem according to the power consumption index corresponding to the specific subsystem, and may compare the power consumption value of the specific subsystem with the peak power threshold to determine whether the power consumed by the specific subsystem reaches the peak power threshold to generate the determining result. According to some embodiments, the power consumption index corresponding to the specific subsystem may indicate the variation of the power consumption value of the specific subsystem with respect to time, such as a slope of a curve of the power consumption value of the specific subsystem with respect to time. For example, the processing circuit 110 may compare this slope of the power consumption value of the specific subsystem with a peak power slope threshold to determine whether the power consumed by the specific subsystem increases too fast, to generate the determining result.

According to some embodiments, the power consumption index corresponding to the specific subsystem may indicate a specific status of the specific subsystem, and the specific status may be a predefined status within a plurality of predefined statuses of the specific subsystem. In addition, the processing circuit 110 may determine the power consumption value of the specific subsystem according to the specific status indicated by the power consumption index corresponding to the specific subsystem, and may compare the power consumption value of the specific subsystem with the peak power threshold to determine whether the power consumed by the specific subsystem reaches the peak power threshold to generate the determining result.

According to some embodiments, the power limiter protection operation may include reducing an operational frequency of at least one component (e.g. one or more components) within the electronic device for a predetermined time period by hardware-masking a clock signal supplied to the aforementioned at least one component. In one example, the predetermined time period may be a predetermined number of cycles of this clock signal. This is for illustrative purposes only, and is not meant to be a limitation of the present invention. According to some embodiments, the power limiter protection operation may include reducing an operational frequency of at least one component (e.g. one or more components) within the electronic device for a predetermined time period by performing dynamic frequency scaling on a clock signal supplied to the aforementioned at least one component, such as the clock signal mentioned above. In one example, the predetermined time period may be a predetermined number of cycles of this clock signal. According to some embodiments, the power limiter protection operation may include reducing a supply voltage supplied to at least one component (e.g. one or more components) within the electronic device for a predetermined time period by performing dynamic voltage scaling on the supply voltage supplied to the aforementioned at least one component. In one example, the predetermined time period may be a predetermined number of cycles of a clock signal supplied to the aforementioned at least one component, such as the clock signal mentioned above.

According to some embodiments, the processing circuit 110 is capable of delaying power-on and/or clock-on request(s) (e.g. one or more power-on requests, and/or one or more clock-on requests) from non-critical component(s) (e.g. one or more non-critical components) within the electronic device according to the power consumption index. According to some embodiments, the processing circuit 110 is capable of delaying power-on and/or clock-on request(s) (e.g. one or more power-on requests, and/or one or more clock-on requests) from non-critical application(s) (e.g. one or more non-critical applications) installed on the electronic device according to the power consumption index. According to some embodiments, the processing circuit 110 is capable of delaying the aforementioned power-on and/or clock-on request(s) from the non-critical component(s) according to the power consumption index, and delaying the aforementioned power-on and/or clock-on request(s) from the non-critical application(s) according to the power consumption index.

According to some embodiments, the processing circuit 110 is capable of raising an interrupt request (IRQ) (e.g. a peak power IRQ, or any of another types of IRQs) according to the power consumption index, to trigger the power limiter protection operation for the electronic device. This is for illustrative purposes only, and is not meant to be a limitation of the present invention. According to some embodiments, the processing circuit 110 is capable of asserting a specific signal (e.g. a peak power signal, or any of another types of signals) according to the power consumption index, to trigger the power limiter protection operation for the electronic device.

According to some embodiments, the processing circuit 110 may trigger the power limiter protection operation for the electronic device to utilize the electric energy available from the battery of the electronic device as much as possible and avoid unintentional shutdown of the electronic device. The unintentional shutdown may represent the shutdown that is not intended by the user (e.g. the unintentional shutdown is not due to pressing the power button of the electronic device, and is not due to shutdown scheduling control of a shutdown scheduling application that is set by the user). As a result, the processing circuit 110 can prevent unintentional shutdown before utilizing the electric energy available from the battery of the electronic device as much as possible.

Figure 3:
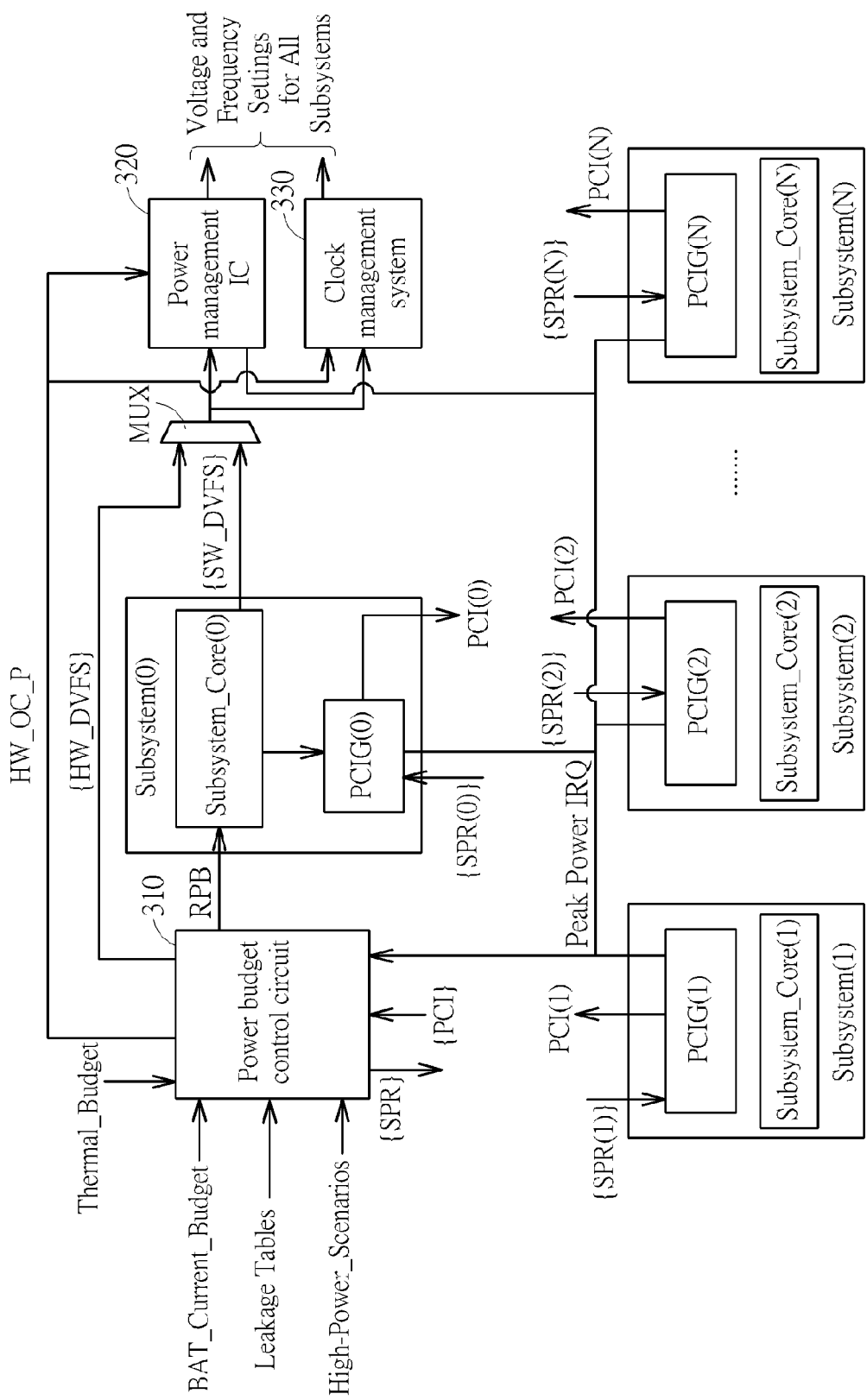
FIG. 3 illustrates a system block diagram involved with the method shown in FIG. 2 according to an embodiment of the present invention.

FIG. 3 illustrates a system block diagram involved with the method 200 shown in FIG. 2 according to an embodiment of the present invention. As shown in FIG. 3, the electronic device of this embodiment may comprise the subsystems Subsystem(0), Subsystem(1), Subsystem(2), . . . , and Subsystem(N), a power budget control circuit 310, a power management IC 320, a clock management system 330, and a multiplexing circuit MUX, where the subsystems Subsystem(0), Subsystem(1), Subsystem(2), . . . , and Subsystem(N) may be equipped with the power consumption index generators PCIG(0), PCIG(1), PCIG(2), . . . , and PCIG(N), respectively, and the multiplexing circuit MUX may comprise at least one multiplexer (e.g. one or more multiplexers). For example, the power budget control circuit 310 of this embodiment may be implemented with a micro control unit (MCU), and therefore can be referred to as a power MCU. In addition, each of the subsystems, such as the Subsystem(n), may comprise a subsystem core Subsystem_Core(n) capable of performing operations of the Subsystem(n), and can be regarded as the main circuit of the Subsystem(n). Thus, the subsystem cores Subsystem_Core(0), Subsystem_Core(1), Subsystem_Core(2), . . . , and Subsystem_Core(N) are capable of controlling the subsystems Subsystem(0), Subsystem(1), Subsystem(2), . . . , and Subsystem(N) to perform their own operations, respectively. For one example, the processing circuit 110 mentioned in some embodiments above may comprise the power budget control circuit 310. The power limiter protection operation may be performed with aid of the subsystem core Subsystem_Core(0), the power management IC 320, the clock management system 330, and the multiplexing circuit MUX.

The processing circuit 110 (for example, the power budget control circuit 310 in this embodiment) may utilize one or more software programmable registers SPR to control the operation of generating the power consumption index PCI (n) such as the (N+1) power consumption indexes PCI(0), PCI(1), PCI(2), . . . , and PCI(N). As shown in FIG. 3, the power budget control circuit 310 may write/update values in the plurality of sets of software programmable registers {SPR}, such as the (N+1) sets of software programmable registers {SPR(0)}, SPR(1)}, {SPR(2)}, . . . , and {SPR(N)}, in the power consumption index generators {PCIG(n)} such as the (N+1) power consumption index generators PCIG(0), PCIG(1), PCIG(2), . . . , and PCIG(N), respectively, and may collect the power consumption indexes {PCI(n)} from the power consumption index generators {PCIG(n)}, respectively. As the processing circuit 110 is capable of utilizing the plurality of sets of software programmable registers {SPR} to control the operations of generating the power consumption indexes {PCI(n)}, respectively, the accuracy of controlling the power budget can be tuned and enhanced, where the values stored in the plurality of sets of software programmable registers {SPR} may be tuned for controlling the power budget more accurately, and the enhanced sets of values of the plurality of sets of software programmable registers {SPR} may be preliminarily stored in the processing circuit 110 and/or may be preliminarily loaded onto the processing circuit 110. As a result, the apparatus 100 of this embodiment, such as the architecture shown in FIG. 3, is capable of more properly and accurately performing system power control within the electronic device.

For example, regarding the operations of performing system power control within the electronic device, one or more control schemes within a plurality of control schemes may be utilized at the same time based on the architecture shown in FIG. 3. Examples of the plurality of control schemes may include, but not limited to, software (SW) dynamic voltage and frequency scaling (DVFS) control schemes, hardware (HW) DVFS control schemes, and an instant clock masking control scheme. According to some aspects, one or more of the control schemes mentioned above may comprise a low battery protection control scheme, a hardware over current (OC) protection control scheme, and a peak power IRQ control scheme.

According to this embodiment, the power budget control circuit 310 may perform power budget calculations according to one or more inputs of the power budget control circuit 310, to generate one or more of multiple outputs of the power budget control circuit 310, where the number of activated outputs within the multiple outputs of the power budget control circuit 310 may depend on the activated control schemes within the plurality of control schemes. Examples of the one or more inputs of the power budget control circuit 310 may include, but not limited to, the thermal budget information Thermal Budget (e.g. the current temperature, the target temperature, and the temperature slope (ΔT/Δtime) such as the temperature variation divided by the associated time interval "Δtime" in which the temperature varies), the battery (BAT) current budget information BAT_Current_Budget (e.g. the power budget (or Allowable-power/Δ time), the battery level, and the low-battery awareness threshold), the leakage tables (e.g. the table of the leakage current vs. the supply voltage, the table of the leakage current vs. the temperature and/or the table of the leakage current vs. the process for each subsystem), the high-power scenarios information High-Power Scenarios (the scenarios consuming high power such as using the camera flash, etc.), the power consumption indexes {PCI(n)}, and the peak power interrupt request Peak Power IRQ (e.g. Imax awareness IRQ, such as the IRQ corresponding to the maximum current Imax).

In addition, examples of the multiple outputs of the power budget control circuit 310 may include, but not limited to, the remaining power budget information RPB, the hardware DVFS information {HW_DVFS}, and the hardware OC protection indicator HW_OC_P. For example, the processing circuit 110 (e.g. the power budget control circuit 310) may utilize the remaining power budget information RPB to generate the software DVFS information {SW_DVFS} in the software DVFS control scheme, for performing software DVFS operations. In another example, the processing circuit 110 may utilize the hardware DVFS information {HW_DVFS} in the hardware DVFS control scheme, for performing hardware DVFS operations. In another example, the processing circuit 110 may utilize the hardware OC protection indicator HW_OC_P in the hardware OC protection control scheme, for hardware OC protection.

According to some embodiments, the subsystem core Subsystem_Core(n) can be implemented with a processor (or a processing circuit). This is for illustrative purposes only, and is not meant to be a limitation of the present invention. According to some embodiments of the present invention, the subsystem core Subsystem_Core(n) can be implemented with any of another type of circuits, where the subsystem core Subsystem_Core(n) is the main circuit of the Subsystem(n).

Please note that examples of the power limiter protection operation mentioned in Step 220 may include, but not limited to, instant clock masking (e.g. hardware Imax control), power limiter protection operations of the HW DVFS type (i.e. HW-DVFS-type power limiter protection operations), and power limiter protection operations of the SW DVFS type (i.e. SW-DVFS-type power limiter protection operations). Regarding the instant clock masking, the specific subsystem may be aware of that the power consumed by itself is reaching a threshold and/or is rising faster than a threshold, and therefore may trigger the power limiter protection operation such as the instant clock masking to prevent an emergency (e.g. unintentional shutdown) by itself (e.g. by masking the clock signal supplied to the specific subsystem). For example, the instant clock masking may be controlled through hard-wired signal(s). The instant clock masking is fast and therefore can, in time, prevent the whole system from unintentional shutdown. As the instant clock masking is fast, unintentional shutdown may not occur before the aforementioned HW-DVFS type power limiter protection operations and the aforementioned SW DVFS type power limiter protection operations can be applied. Some implementation details regarding the instant clock masking are described in the embodiments respectively shown in FIG. 9, FIG. 10, and FIG. 11. In addition, regarding the HW-DVFS type power limiter protection operations, when receiving an IRQ such as that mentioned above or a specific signal such as that mentioned above (e.g. a peak power IRQ from a subsystem and/or an IRQ from the power management IC 320), the power budget control circuit 310 may configure the power management IC 320 and/or the clock management system 330, to perform DVFS operations. For example, the paths of the hardware OC protection indicator HW_OC_P and the hardware DVFS information HW DVFS can be regarded as control paths for the power budget control circuit 310 to configure the power management IC 320 and/or the clock management system 330 to perform DVFS operations. Some implementation details regarding the HW-DVFS type power limiter protection operations are described in the embodiments respectively shown in FIG. 6, FIG. 7, and FIG. 8. Additionally, regarding the SW-DVFS type power limiter protection operations, the subsystem core Subsystem_Core(0) may receive the remaining power budget information RPB and/or the power consumption index PCI(n), to configure the power management IC 320 and/or the clock management system 330 to perform DVFS operations. Some implementation details regarding the SW-DVFS type power limiter protection operations are described in the embodiments respectively shown in FIG. 4 and FIG. 5. According to some embodiments, one or more examples of the power limiter protection operation mentioned in Step 220 (e.g. the power limiter protection operations of the instant clock masking, the HW-DVFS-type power limiter protection operations, and/or the SW-DVFS-type power limiter protection operations) can be utilized at the same time. Besides, though in the embodiments shown in FIGS. 4-8, the power limiter protection operations may be triggered and/or performed by the power budget control circuit 310 and the subsystem core Subsystem_Core(0), any component capable of configuring the power management IC 320 and/or the clock management system 330 may trigger and/or perform the power limiter protection operation.

Figure 4:
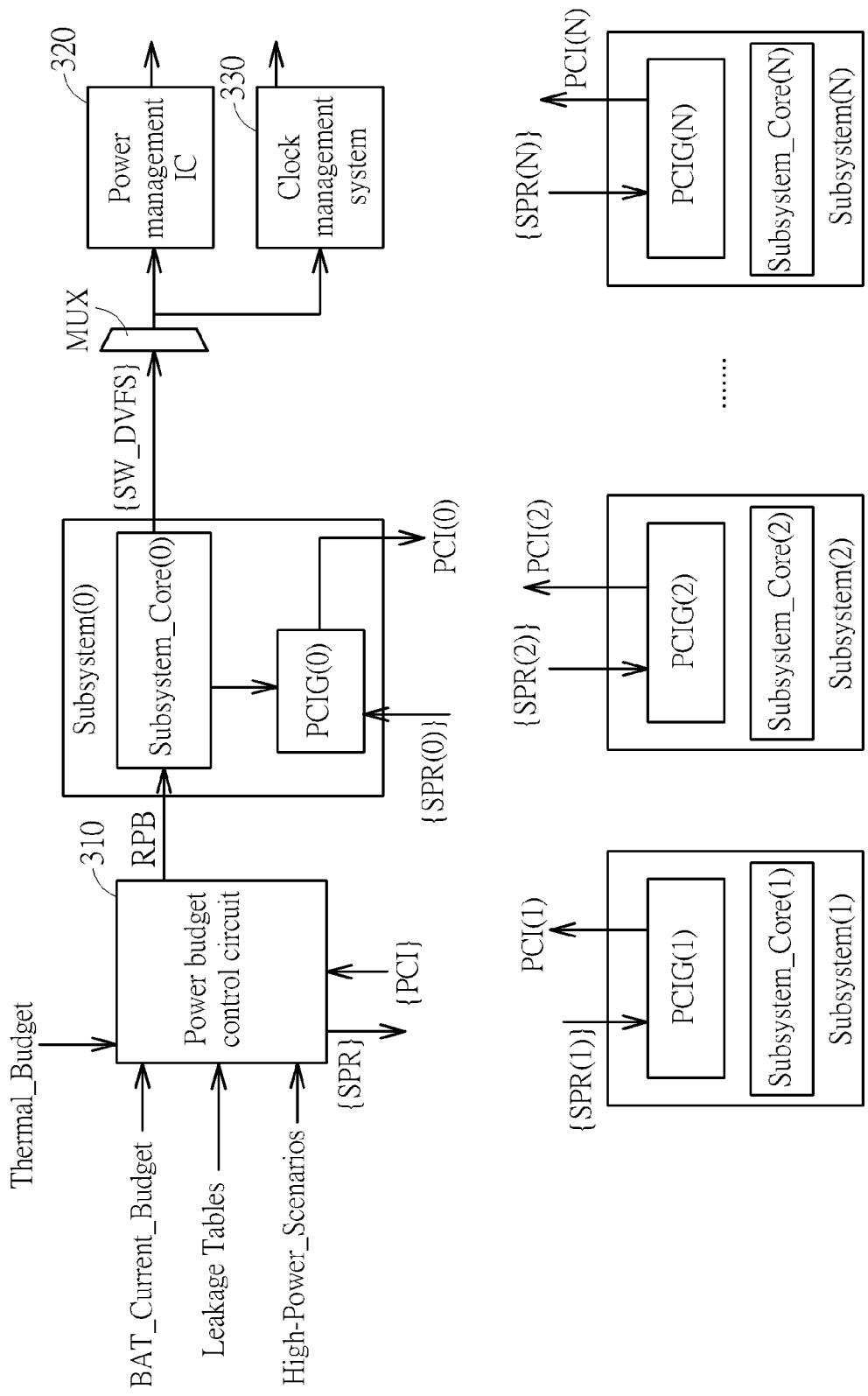
FIG. 4 illustrates a low battery protection control scheme involved with the method shown in FIG. 2 according to an embodiment of the present invention.

FIG. 4 illustrates the low battery protection control scheme involved with the method 200 shown in FIG. 2 according to an embodiment of the present invention. According to this embodiment, the processing circuit 110 (e.g. the power budget control circuit 310) of the architecture shown in FIG. 4 may trigger the power limiter protection operation of the low battery protection control scheme for the electronic device. For example, when the battery is low (e.g. the battery current budget information BAT_Current_Budget indicates that battery level is low), the processing circuit 110 may perform at least one portion (e.g. a portion or all) of a plurality of low battery protection operations, such as: (1) gating the power-on and/or clock-on request(s) from non-critical component(s) and/or gating the power-on and/or clock-on request(s) from non-critical application(s); (2) outputting enhanced voltage and frequency settings; and (3) allocating battery resource(s) for the critical component(s) to achieve graceful degradation.

For example, based on application scenarios, the remaining power budget information RPB and/or power consumption index {PCI} the subsystem core Subsystem_Core(0) may output enhanced DVFS settings for thermal and/or battery control through the software DVFS information {SW_DVFS}. In addition, as the low battery protection control scheme may be applied to the architecture shown in FIG. 3, for low battery protection control, the multiplexing circuit MUX may select the software DVFS information {SW_DVFS}, for being sent toward the power management IC 320 and/or the clock management system 330, where the multiplexing circuit MUX may still select the hardware DVFS information {HW_DVFS} for being sent toward the power management IC 320 and/or the clock management system 330 when needed. As a result, the processing circuit 110 may utilize the power management IC 320 and the clock management system 330 to perform the aforementioned at least one portion of the plurality of low battery protection operations. For example, the subsystem cores Subsystem_Core(0) may gate power-on request(s) and/or clock-on request(s) from non-critical component(s) and/or power-on request(s) and/or clock-on request(s) from non-critical application(s) and generate the software DVFS information {SW_DVFS}, for controlling the power management IC 320 and/or the clock management system 330, to prevent the aforementioned unintentional shutdown of the electronic device. In another example, under given thermal and power budget, the subsystem cores Subsystem_Core(0) may adaptively output enhanced voltage settings and/or enhanced frequency settings (or enhanced clock frequency settings), for controlling the power management IC 320 and/or the clock management system 330, to prevent the aforementioned unintentional shutdown of the electronic device. In another example, based on the remaining power budget information RPB, the subsystem cores Subsystem_Core(0) may control the power management IC 320 to allocate the battery resource(s) for the critical component(s) to achieve graceful degradation, without encountering the aforementioned unintentional shutdown of the electronic device, where the performance of the electronic device may be gracefully degraded without bringing inconvenience to the user.

Figure 5:
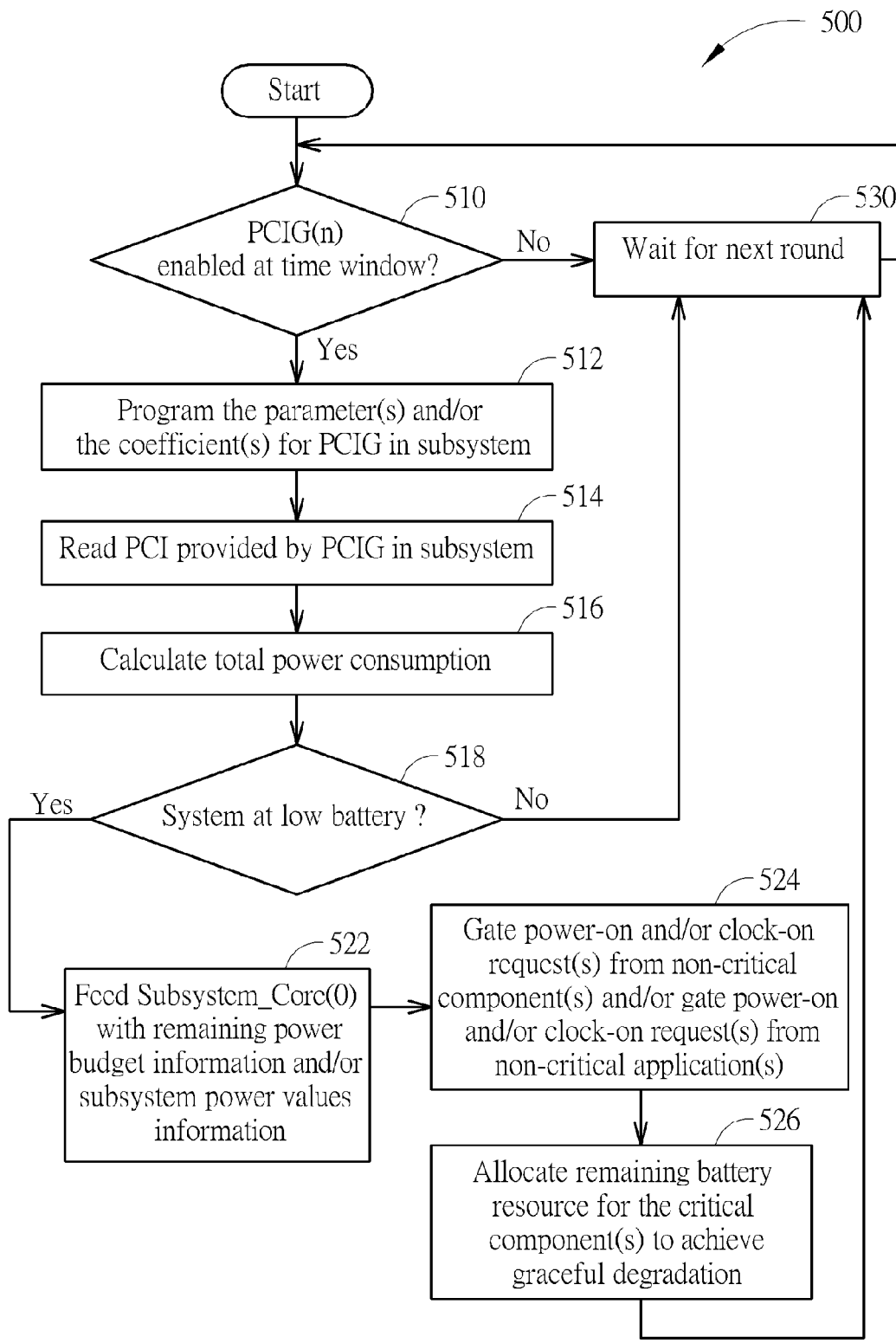
FIG. 5 illustrates a working flow involved with the method shown in FIG. 2 according to an embodiment of the present invention.

FIG. 5 illustrates a working flow 500 involved with the method 200 shown in FIG. 2 according to an embodiment of the present invention. For example, the working flow 500 can be applied to the processing circuit 110 of the embodiment shown in FIG. 1, and for example, can be applied to the power budget control circuit 310, the subsystem core Subsystem_Core(0), the power management IC 320, and the clock management system 330 shown in FIG. 3 in the low battery protection control scheme. Please note that, when needed, the processing circuit 110 (e.g. the power budget control circuit 310) may selectively enable the power consumption index generators {PCIG(n)}, and may switch between enabling the power consumption index generators {PCIG(n)} and disabling the power consumption index generators {PCIG(n)}.

In Step 510, the power budget control circuit 310 may check whether the power consumption index generator(s) PCIG(n) is/are enabled at a current time window. The power consumption index generator(s) PCIG(n) may be enabled by the power budget control circuit 310. When it is detected that the power consumption index generator(s) PCIG(n) is/are enabled at this time window, Step 512 is entered; otherwise, Step 530 is entered.

In Step 512, the power budget control circuit 310 may program (or write) the parameter(s) and/or the coefficient(s) for the power consumption index generator(s) PCIG(n) in the subsystem(s) Subsystem(n).

In Step 514, the power budget control circuit 310 may read the power consumption index(es) PCI(n) provided by the power consumption index generator(s) PCIG(n) in the subsystem(s) Subsystem(n).

In Step 516, the power budget control circuit 310 may calculate the total power consumption of the subsystems according to the power consumption indexes PCI(n) if the steps 510-514 are performed for multiple subsystems. And if the steps 510-514 are performed for all subsystems of the electronic device, the total power consumption of the electronic device may be obtained.

In Step 518, the power budget control circuit 310 may check whether the system (e.g. a portion of or the whole system of the electronic device) is at a low battery state. When it is detected that the system is at the low battery state, Step 522 is entered; otherwise, Step 530 is entered.

In Step 522, the power budget control circuit 310 may feed the subsystem core Subsystem_Core(0) with the remaining power budget information RPB and/or subsystem power values information. For example, the subsystem power values information may comprise the power consumption indexes {PCI(n)}, and the power consumption indexes {PCI(n)} of this situation may be the subsystem power values of the subsystems {Subsystem(n)} (i.e. the power consumed by the subsystems {Subsystem(n)}), respectively. In another example, the subsystem power values information may comprise some derivatives of the power consumption indexes {PCI(n)}, and the power consumption indexes {PCI(n)} of this situation may be proportional to the subsystem power values of the subsystems {Subsystem(n)} (i.e. the power consumed by the subsystems {Subsystem(n)}), respectively.

In Step 524, the subsystem core Subsystem_Core(0) may gate (or block) the power-on and/or clock-on request(s) from non-critical component(s) and/or gate (or block) the power-on and/or clock-on request(s) from non-critical application(s).

In Step 526, the subsystem core Subsystem_Core(0) may allocate the remaining battery resource(s) for the critical component(s) to achieve graceful degradation.

In Step 530, the power budget control circuit 310 may wait for the next round (of operations).

It should be noted that in different embodiments, the steps shown in FIG. 5 can be executed in different orders, one or more steps may be added to the flow, and one or more steps may be omitted (e.g. step 510 may be omitted if PCIG(n) is always enabled, step 512 may be omitted if the parameter(s) and/or coefficient(s) are designed to be fixed, etc.).

According to some embodiments, regarding the SW-DVFS type power limiter protection operations, the subsystem core Subsystem_Core(0) may receive an IRQ such as that mentioned above, to configure the power management IC 320 and/or the clock management system 330 to perform DVFS operations.

Figure 6:
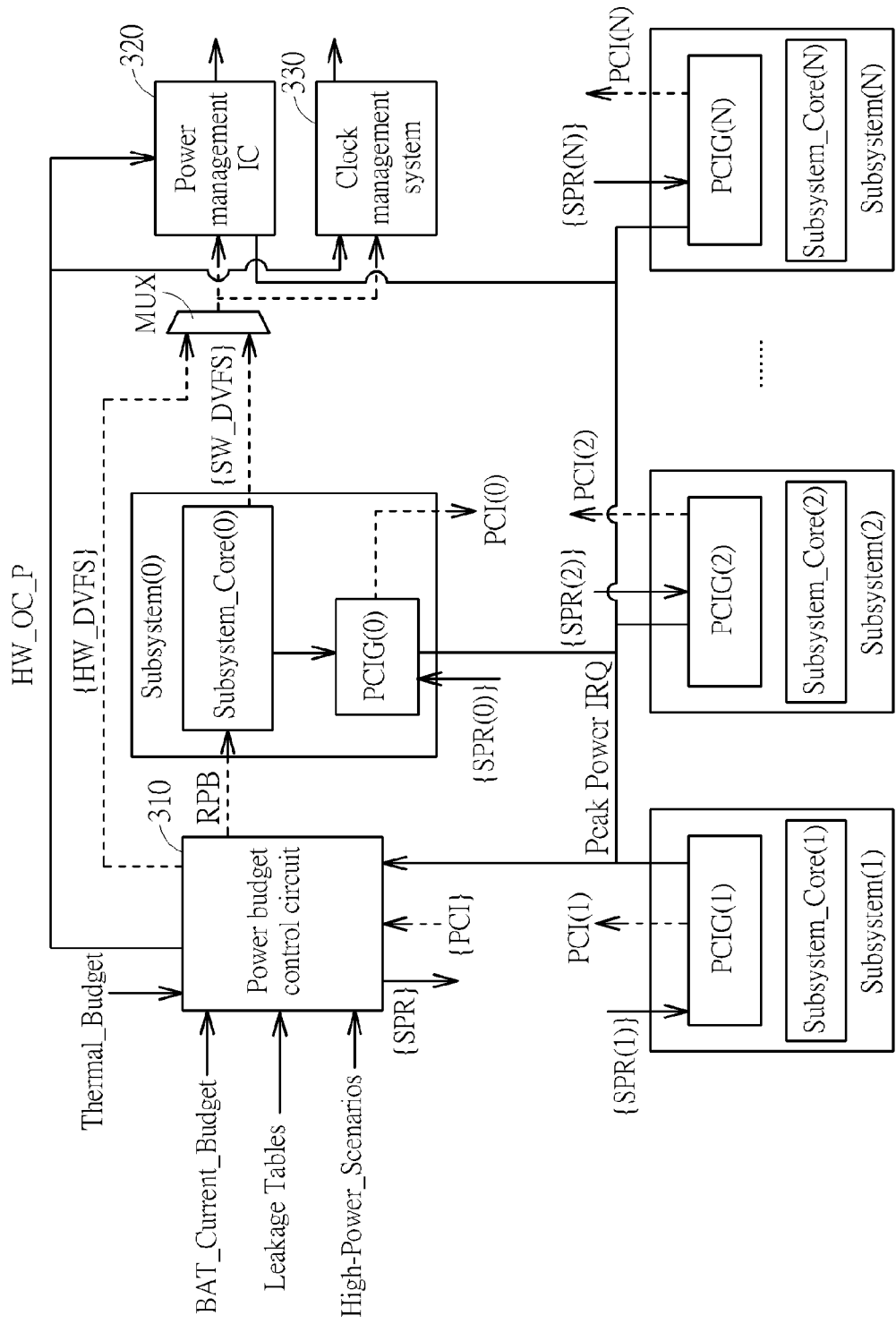
FIG. 6 illustrates a peak power interrupt request (IRQ) control scheme involved with the method shown in FIG. 2 according to an embodiment of the present invention.

FIG. 6 illustrates the peak power IRQ control scheme involved with the method 200 shown in FIG. 2 according to an embodiment of the present invention. According to this embodiment, the processing circuit 110 (e.g. power budget control circuit 310) of the architecture shown in FIG. 6 may trigger and perform the power limiter protection operation of at least one control scheme (e.g. one or two control schemes) within the peak power IRQ control scheme and the hardware OC protection control scheme for the electronic device. For example, when the peak power IRQ occurs (e.g. the peak power IRQ is detected and therefore peak power protection is required), the processing circuit 110 may perform at least one portion (e.g. a portion or all) of a plurality of peak power protection operations, such as one or more operations within the peak power protection operations of: (1) delaying the power-on and/or clock-on request(s) from non-critical component(s) and/or delaying the power-on and/or clock-on request(s) from non-critical application(s); (2) trying frequency scaling by clock hopping and/or by hardware clock-cycle masking (e.g. through dividing a clock by 2, 4, 8, etc.); and (3) if the peak power IRQ still asserts, applying voltage scaling until the system (e.g. the whole system of the electronic device) is safe.

In one embodiment, the processing circuit 110 of this embodiment may comprise one or more comparison units for comparing the subsystem power value(s) information of the subsystem(s) Subsystem(n) with the peak power threshold. In one example, there may be a plurality of comparison units {CMP(n)} that are integrated into the power consumption index generators {PCIG(n)}, respectively. The subsystem power value(s) information may comprise the power consumption index(es) PCI(n). The power consumption index(es) PCI(n) may represent the power consumption value(s) of the subsystem(s) Subsystem(n) (i.e. the power consumed by the subsystem(s) Subsystem(n)). In another example, the subsystem power value(s) information may comprise some derivatives of the power consumption index(es) PCI(n), and the power consumption index(es) PCI(n) of this situation may be proportional to the power consumption value(s) of the subsystem(s) Subsystem(n) (i.e. the power consumed by the subsystem(s) Subsystem(n)). No matter whether the subsystem power value(s) information comprises the power consumption index(es) PCI(n) or comprises the derivatives of the power consumption index(es) PCI(n), when a comparison unit CMP(n) detects that the power consumed by the subsystem Subsystem(n) reaches the peak power threshold, this comparison unit CMP(n) may send out the peak power IRQ. As a result, the processing circuit 110 of this embodiment may trigger the power limiter protection operation for the electronic device, and may perform the aforementioned at least one portion of the plurality of peak power protection operations.

Figure 7:
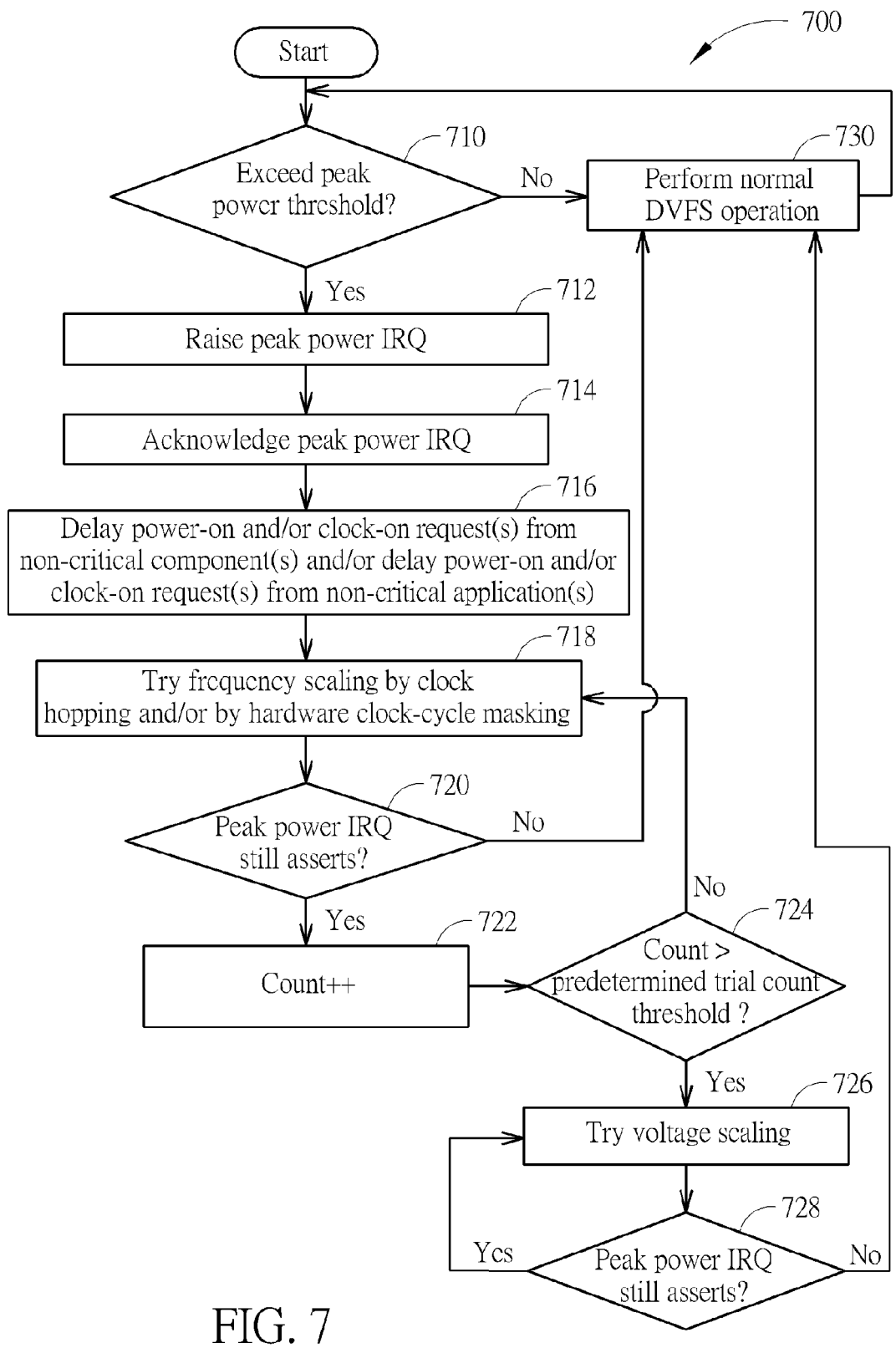
FIG. 7 illustrates a working flow involved with the method shown in FIG. 2 according to an embodiment of the present invention.

FIG. 7 illustrates a working flow 700 involved with the method 200 shown in FIG. 2 according to an embodiment of the present invention. For example, the working flow 700 can be applied to the power budget control circuit 310, the power management IC 320, and the clock management system 330 in FIG. 3 in the peak power IRQ control scheme. Please note that, when needed, the processing circuit 110 (e.g. the power budget control circuit 310) may selectively enable the power consumption index generators {PCIG(n)}, and may switch between enabling the power consumption index generators {PCIG(n)} and disabling the power consumption index generators {PCIG(n)}.

In Step 710, the comparison unit(s) CMP(n) may check whether the power consumption value of subsystem(s) Subsystem(n) (i.e. power consumed by the subsystem(s) Subsystem(n)) reaches the peak power threshold. In one example, the comparison unit CMP(n) is integrated into the power consumption index generator PCIG(n) within the subsystem Subsystem(n). When it is detected that the power consumed by one or more subsystems, such as the subsystem Subsystem(n), reaches the peak power threshold, Step 712 is entered; otherwise, Step 730 is entered.

In Step 712, the subsystem Subsystem(n) may raise the peak power IRQ, which can be a level-trigger interrupt in this embodiment.

In Step 714, the power budget control circuit 310 may acknowledge the peak power IRQ.

In Step 716, the power budget control circuit 310 may delay the power-on and/or clock-on request(s) from non-critical component(s) and/or delay the power-on and/or clock-on request(s) from non-critical application(s).

In Step 718, the power budget control circuit 310 may try frequency scaling by clock hopping and/or by hardware clock-cycle masking. For example, in a situation where the power budget control circuit 310 performs frequency scaling by clock hopping, the power budget control circuit 310 may control clock hopping of one or more subsystems within the subsystems {Subsystem(n)} through the clock management system 330, and therefore, the one or more subsystems within the subsystems {Subsystem(n)} may operate according to lower frequency clock(s). In another example, in a situation where the power budget control circuit 310 performs frequency scaling by hardware clock-cycle masking, the power budget control circuit 310 may control the clock frequency of a clock of one or more subsystems within the subsystems {Subsystem(n)} through the clock management system 330, where the clock management system 330 may divide the clock (more specifically, the frequency thereof) by 2, 4, 8, etc. and feed the one or more subsystems within the subsystems {Subsystem(n)} with the divided clock.

In Step 720, the power budget control circuit 310 may check whether the peak power IRQ still asserts. When it is detected that the peak power IRQ still asserts, Step 722 is entered; otherwise, Step 730 is entered.

In Step 722, the power budget control circuit 310 may increase a count value Count by the increment of one (labeled "Count++", for better comprehension).

In Step 724, the power budget control circuit 310 may check whether the count value Count is greater than a predetermined trial count threshold such as a programmable number of trial No_Trial, where this programmable number of trial No_Trial is programmable, and can be varied when needed. When it is detected that the count value Count is greater than the predetermined trial count threshold, Step 726 is entered; otherwise, Step 718 is re-entered.

In Step 726, the power budget control circuit 310 may try voltage scaling. For example, in a situation where the peak power IRQ still asserts, the power budget control circuit 310 may utilize the power management IC 320 to apply voltage scaling.

In Step 728, the power budget control circuit 310 may check whether the peak power IRQ still asserts. When it is detected that the peak power IRQ still asserts, Step 726 is re-entered; otherwise, Step 730 is entered.

For example, in a situation where the peak power IRQ still asserts, the power budget control circuit 310 may utilize the power management IC 320 to apply voltage scaling until the system (e.g. the whole system of the electronic device) is safe.

In Step 730, the power budget control circuit 310 may utilize the power management IC 320 and the clock management system 330 to perform normal DVFS operations.

It should be noted that in different embodiments, the steps shown in FIG. 7 can be executed in different orders, one or more steps may be added to the flow, and one or more steps may be omitted (e.g. steps 722 and 724 may be omitted to simplify the flow).

Figure 8:
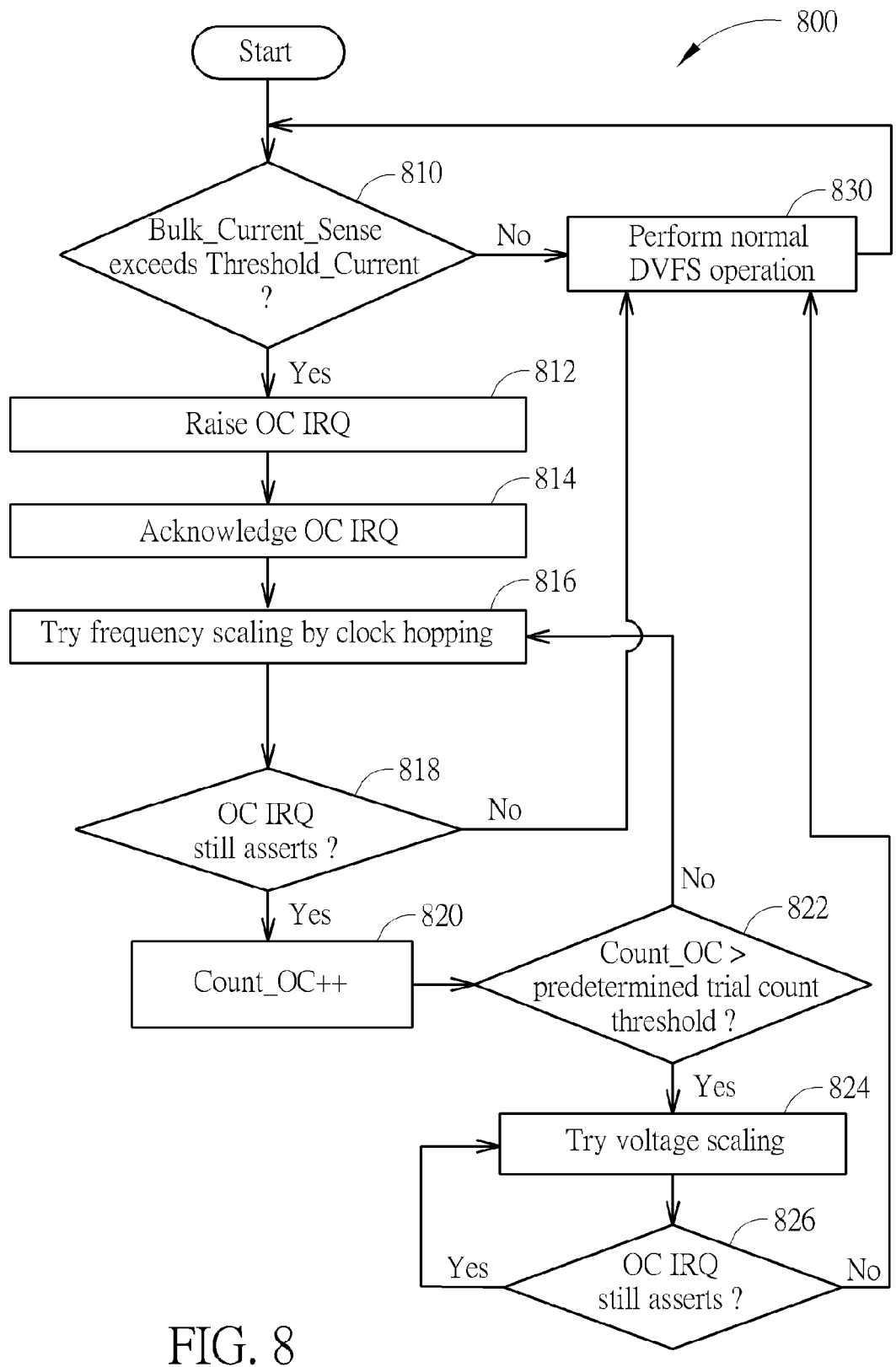
FIG. 8 illustrates a working flow involved with the method shown in FIG. 2 according to another embodiment of the present invention.

FIG. 8 illustrates a working flow 800 involved with the method 200 shown in FIG. 2 according to another embodiment of the present invention. For example, the working flow 800 can be applied to the power budget control circuit 310, the power management IC 320, and the clock management system 330 in FIG. 3 in the hardware OC protection control scheme. Please note that, when needed, the processing circuit 110 (e.g. the power budget control circuit 310) may selectively enable the power consumption index generators {PCIG(n)}, and may switch between enabling the power consumption index generators {PCIG(n)} and disabling the power consumption index generators {PCIG(n)}.

In Step 810, the power management IC 320 may check whether the sensed bulk current Bulk_Current_Sense (e.g. a bulk current that is sensed by the power management IC 320) exceeds a predetermined current threshold Threshold_Current. When it is detected that the sensed bulk current Bulk_Current_Sense exceeds the predetermined current threshold Threshold_Current, Step 812 is entered; otherwise, Step 830 is entered.

In Step 812, the power management IC 320 may raise an over current interrupt request (OC IRQ) (e.g. the OC IRQ OC_EINT_IRQ), which can be a level-trigger interrupt in this embodiment.

In Step 814, the power budget control circuit 310 may acknowledge the OC IRQ. In one embodiment, the apparatus for performing system power control within the electronic device may comprise a dedicated pad or a specific interface, for transmitting the OC IRQ from the power management IC 320 to the power budget control circuit 310. For example, in a situation where the apparatus comprises a dedicated external interrupt (EINT) pad, the power management IC 320 may raise the over current interrupt request OC IRQ (e.g. the OC IRQ OC_EINT_IRQ) through this dedicated EINT pad and the power budget control circuit 310 may acknowledge the OC IRQ through this dedicated EINT pad. This is for illustrative purposes only, and is not meant to be a limitation of the present invention. According to some embodiments of the present invention, in a situation where the apparatus comprises a Serial Peripheral Interface (SPI) wrapper interface, the power management IC 320 may raise the OC IRQ (e.g. the OC IRQ OC_EINT_IRQ) through this SPI wrapper interface and the power budget control circuit 310 may acknowledge the OC IRQ through this SPI wrapper interface.

In Step 816, the power budget control circuit 310 may try frequency scaling by clock hopping. For example, in a situation where the power budget control circuit 310 performs frequency scaling by clock hopping, the power budget control circuit 310 may control clock hopping of one or more subsystems within the subsystems {Subsystem(n)} through the clock management system 330, and therefore, the one or more subsystems within the subsystems {Subsystem(n)} may operate according to lower frequency clock(s).

In Step 818, the power budget control circuit 310 may check whether the OC IRQ still asserts. When it is detected that the OC IRQ still asserts, Step 820 is entered; otherwise, Step 830 is entered.

In Step 820, the power budget control circuit 310 may increase a count value Count_OC by the increment of one (labeled "Count_OC++", for better comprehension).

In Step 822, the power budget control circuit 310 may check whether the count value Count_OC is greater than a predetermined trial count threshold such as a programmable number of trial No_Trial_OC, where this programmable number of trial No_Trial_OC is programmable, and can be varied when needed. When it is detected that the count value Count_OC is greater than this predetermined trial count threshold, Step 824 is entered; otherwise, Step 816 is re-entered.

In Step 824, the power budget control circuit 310 may try voltage scaling. For example, the power budget control circuit 310 may utilize the power management IC 320 to apply voltage scaling through an interface such as an inter-integrated circuit (I2C) interface.

In Step 826, the power budget control circuit 310 may check whether the OC IRQ still asserts. When it is detected that the OC IRQ still asserts, Step 824 is re-entered; otherwise, Step 830 is entered.

For example, in a situation where the OC IRQ still asserts, the power budget control circuit 310 may utilize the power management IC 320 to apply voltage scaling until the system (e.g. the whole system of the electronic device) is safe.

In Step 830, the power budget control circuit 310 may utilize the power management IC 320 and the clock management system 330 to perform normal DVFS operations.

It should be noted that in different embodiments, the steps shown in FIG. 8 can be executed in different orders, one or more steps may be added to the flow, and one or more steps may be omitted (e.g. steps 820 and 822 may be omitted to simplify the flow).

Figure 9:
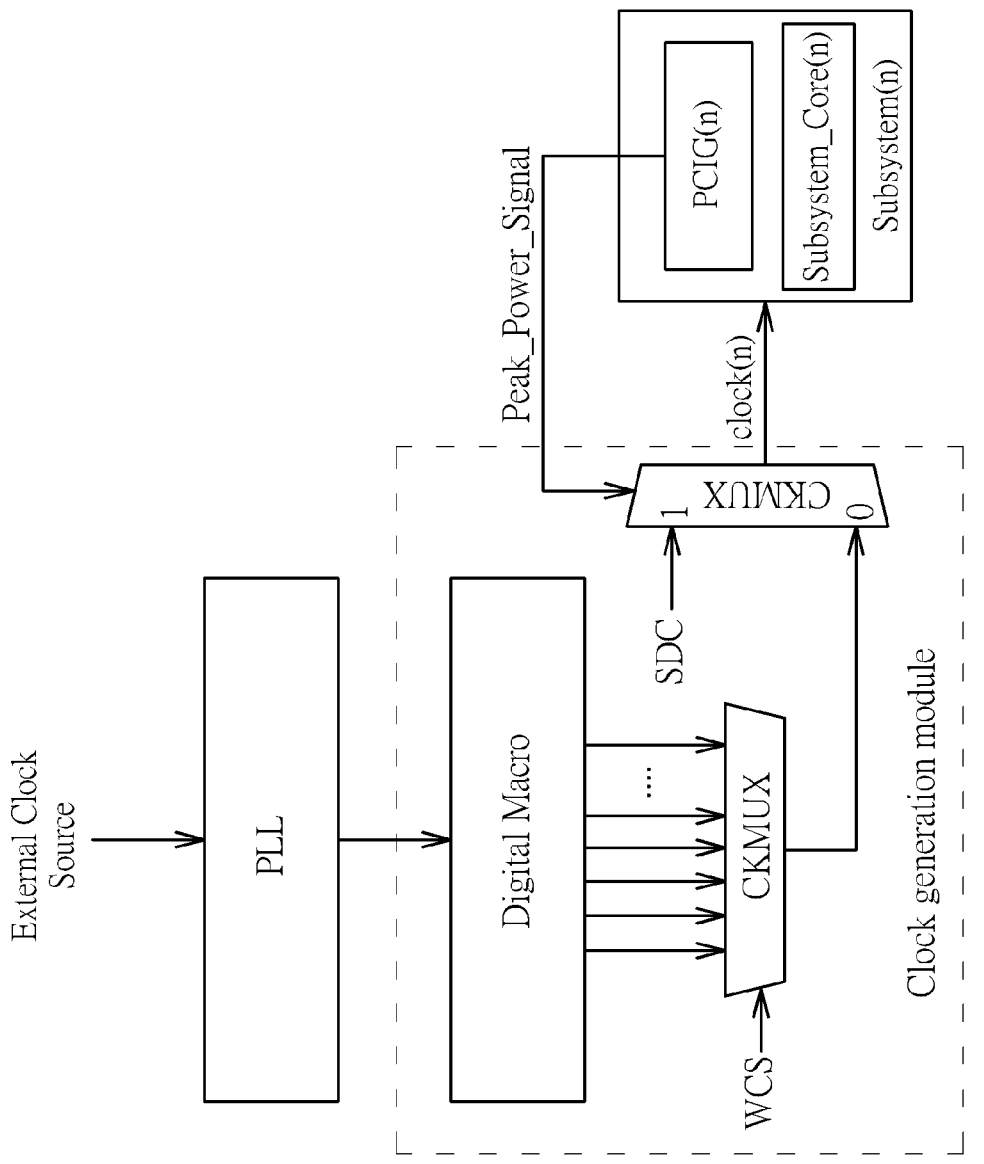
FIG. 9 illustrates an instant clock masking control scheme involved with the method shown in FIG. 2 according to an embodiment of the present invention.

FIG. 9 illustrates the instant clock masking control scheme involved with the method 200 shown in FIG. 2 according to an embodiment of the present invention. According to this embodiment, a component of the Subsystem(n) may trigger the power limiter protection operation of the instant clock masking control scheme for the electronic device.

As shown in FIG. 9, the clock management system 330 of this embodiment may comprise the phase locked loop (PLL), the digital macro module, and the clock multiplexing circuits {CKMUX} shown in FIG. 9, where any of the clock multiplexing circuits {CKMUX} may comprise at least one multiplexer (e.g. one or more multiplexers). The PLL may receive an external clock from the external clock source to lock onto the frequency of this external clock, and the output clock of the PLL may be sent to the digital macro module. In addition, the digital macro module may generate a set of clocks according to the output clock of the PLL, for being selected by the clock multiplexing circuits {CKMUX} for further use. Additionally, a working clock selection multiplexing circuit within the clock multiplexing circuits {CKMUX} (i.e. the clock multiplexing circuit CKMUX that receives the set of clocks) may select a working clock from the set of clocks according to working clock selection information WCS, and a slow-down clock multiplexing circuit within the clock multiplexing circuits {CKMUX} (i.e. the other multiplexing circuit within the clock multiplexing circuits {CKMUX}) may select the working clock or a slow-down clock SDC according to the peak power signal Peak_Power_Signal. For example, the slow-down clock SDC may be obtained from dividing one of the set of clocks (more specifically, the frequency thereof). This is for illustrative purposes only, and is not meant to be a limitation of the present invention. According to some embodiments of the present invention, the slow-down clock SDC may be obtained from one of the set of clocks, for example, the one having the lowest frequency than others within the set of clocks.

Please note that, in the architecture shown in FIG. 9, a close-loop comprising the power consumption index generator PCIG(n) and the clock generation module may be utilized for peak power protection when needed. For example, the power consumption index generator PCIG(n) within the subsystem Subsystem(n) may generate the peak power signal Peak_Power_Signal. In one example, one or more comparison units CMP(n) may be included in the subsystem Subsystem(n), either inside or outside the power consumption index generator PCIG(n). When the comparison unit CMP(n) detects that the power consumed by the subsystem Subsystem(n) reaches the peak power threshold, the comparison unit CMP(n) may send out the peak power signal Peak_Power_Signal having an enabling state "1", causing the slow-down clock multiplexing circuit to select the slow-down clock SDC; otherwise (i.e. in a situation where the comparison unit CMP(n) detects that the power consumed by the subsystem Subsystem(n) does not reach the peak power threshold), the comparison unit CMP(n) may send out the peak power signal Peak_Power_Signal having an disabling state "0", causing the slow-down clock multiplexing circuit to select the working clock. The peak power signal Peak_Power_Signal here is for illustration only, any other signal that causes the clock management system 330 to supply clock signal with lower frequency to the subsystem Subsystem(n) should fall within the scope of the invention. As a result, a component of the Subsystem(n) of this embodiment may trigger the power limiter protection operation for the electronic device for peak power protection.

Figure 10:
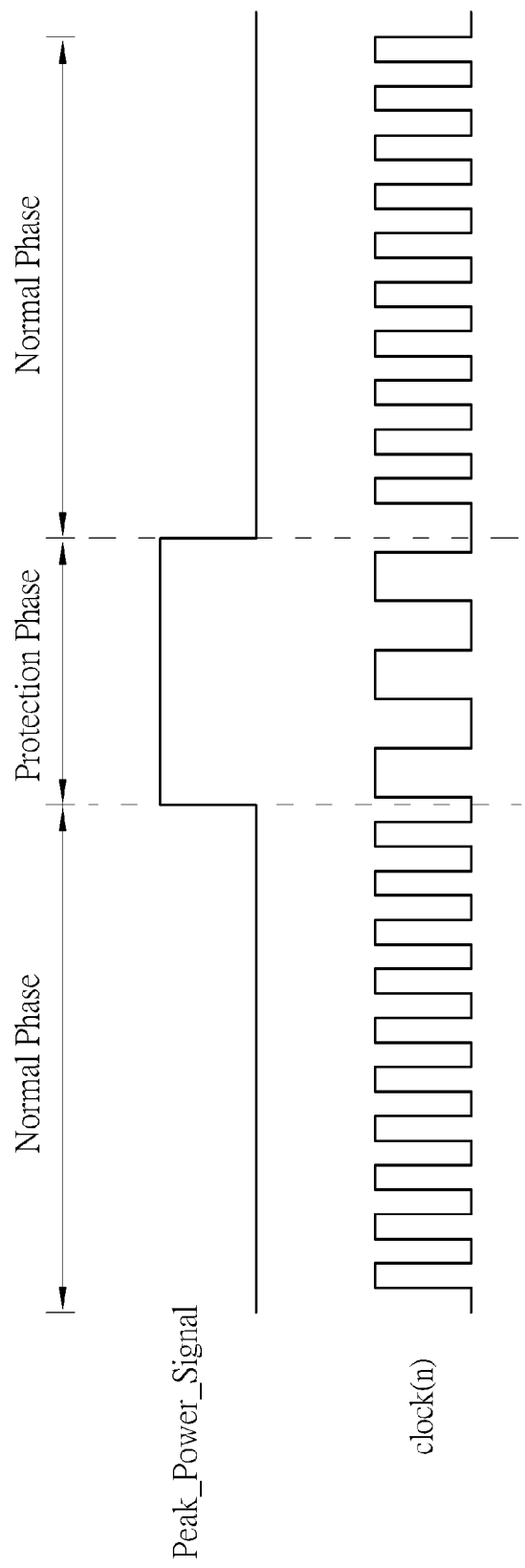
FIG. 10 illustrates some signals involved with the instant clock masking control scheme shown in FIG. 9.

FIG. 10 illustrates some signals involved with the instant clock masking control scheme shown in FIG. 9, such as the peak power signal Peak_Power_Signal and the clock clock (n) output by the slow-down clock multiplexing circuit. As shown in FIG. 10, in the normal phases, the subsystem Subsystem(n) may operate at a full speed. In addition, in a protection phase, the subsystem Subsystem(n) may operate at a slow-down speed. Please note that the frequency setting may be temporarily overwritten during the protection phase for the subsystem Subsystem(n), and the original frequency setting (i.e. the frequency setting before the protection phase) may be recovered when or after the subsystem Subsystem(n) leaves the protection phase.

Figure 11:
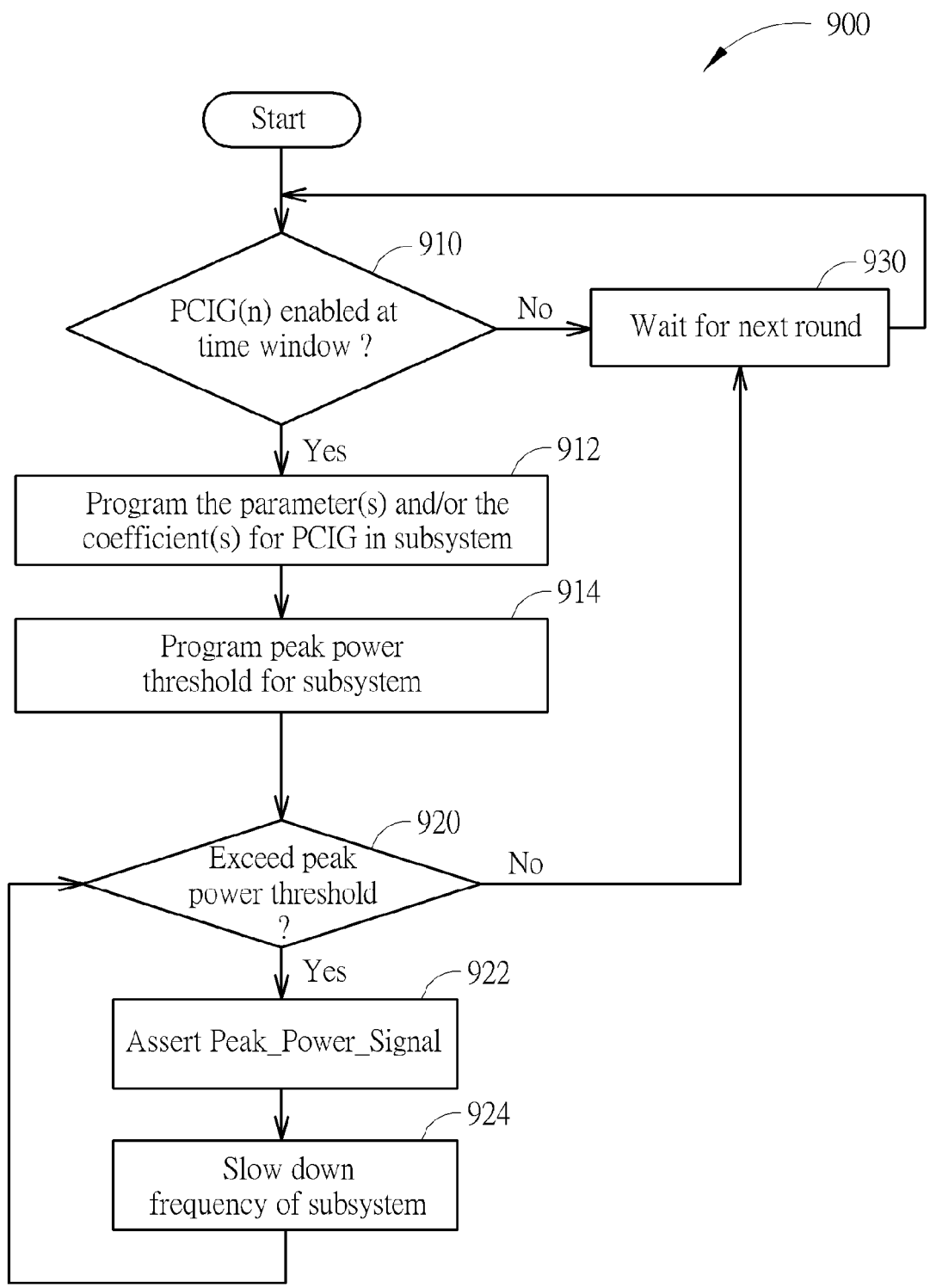
FIG. 11 illustrates a working flow involved with the method shown in FIG. 2 according to an embodiment of the present invention.

FIG. 11 illustrates a working flow 900 involved with the method 200 shown in FIG. 2 according to an embodiment of the present invention. For example, the working flow 900 can be applied to power budget control circuit 310, the subsystem Subsystem(n) and the clock management system 330 shown in FIG. 3 in the instant clock masking control scheme. Please note that, when needed, the power budget control circuit 310 may selectively enable the power consumption index generators {PCIG(n)}, and may switch between enabling the power consumption index generators {PCIG(n)} and disabling the power consumption index generators {PCIG(n)}.

In Step 910, the power budget control circuit 310 may check whether the power consumption index generator(s) PCIG(n) is/are enabled at a current time window. The power consumption index generator(s) PCIG(n) may be enabled by the power budget control circuit 310. When it is detected that the power consumption index generator(s) PCIG(n) is/are enabled at this time window, Step 912 is entered; otherwise, Step 930 is entered.

In Step 912, the power budget control circuit 310 may program (or write) the parameter(s) and/or the coefficient(s) for the power consumption index generator(s) PCIG(n) in the subsystem(s) Subsystem(n).

In Step 914, the power budget control circuit 310 may program (or write) the peak power threshold for the subsystem(s) Subsystem(n).

In Step 920, one or more components in the subsystem(s) Subsystem(n) (e.g. one or more comparison units CMP(n)) may check whether the power consumed by the subsystem(s) Subsystem(n) exceeds the peak power threshold. When it is detected that the power consumed by a subsystem such as the subsystem Subsystem(n) exceeds the peak power threshold, Step 922 is entered; otherwise, Step 930 is entered.

In Step 922, this subsystem such as the subsystem Subsystem(n) may assert the peak power signal Peak_Power_Signal. For example, the subsystem Subsystem(n) may assert the peak power signal Peak_Power_Signal to the aforementioned enabling state "1" thereof.

In Step 924, the clock management system 330 may slow down the frequency of the associated subsystem such as the subsystem Subsystem(n) (e.g. the frequency of the clock clock(n) shown in FIG. 10).

In Step 930, the power budget control circuit 310 may wait for the next round (of operations).

It should be noted that in different embodiments, the steps shown in FIG. 11 can be executed in different orders, one or more steps may be added to the flow, and one or more steps may be omitted (e.g. Step 910 may be omitted if the power consumption index generator PCIG(n) is always enabled, Step 912 may be omitted if the parameter(s) and/or coefficient(s) are designed to be fixed, etc.).

According to some embodiments, the peak power signal Peak_Power_Signal sent from the subsystem Subsystem(n) may be utilized for changing or masking the clock signal(s) of one or more other subsystems. According to some embodiments, the peak power signal Peak_Power_Signal sent from the subsystem Subsystem(n) may be utilized for changing or reducing the supply voltage(s) of the subsystem Subsystem(n) and/or the supply voltage(s) of one or more other subsystems.

According to some embodiments, the power limiter protection operation mentioned in Step 220 can be applied to the subsystem that consumes the power, or to any of the other subsystems. For example, in a situation where the subsystem that consumes the power belongs to hard real-time architecture and the performance thereof should not be reduced (for example, this subsystem is running an application playing movie(s) or a game application, which may need real time performance), the power limiter protection operation mentioned in Step 220 can be applied to any of the other subsystems to reduce overall power consumption of the electronic device.

According to some embodiments, the power budget control circuit 310 or the subsystem core Subsystem_core(0) may trigger the power limiter protection operation. This is for illustrative purposes only, and is not meant to be a limitation of the present invention. Any component that can configure the configure power management IC 320 and/or the clock management system 330 may trigger the power limiter protection operation. According to some embodiments, the operation of determining whether the power consumed by the specific subsystem reaches the peak power threshold can be performed by any component that can obtain the power consumption index and the peak power threshold. According to some embodiments, the operation of determining whether the slope of power consumption by the specific subsystem versus time reaches the peak power slope threshold can be performed by any component that can obtain the power consumption index and the peak power slope threshold.

According to some embodiments, the parameter(s), the coefficient(s), the threshold(s) (e.g. the parameter(s) and/or the coefficient(s) for the power consumption index generator(s) PCIG(n), the peak power threshold, etc.) may vary by subsystems. According to some embodiments, in a situation where there are multiple parameters, multiple coefficients, and/or multiple thresholds for the same subsystem, these parameters can be different from each other, these coefficients can be different from each other, and/or these thresholds can be different from each other.

Those skilled in the art will readily observe that numerous modifications and alterations of the device and method may be made while retaining the teachings of the invention.

Accordingly, the above disclosure should be construed as limited only by the metes and bounds of the appended claims.

The invention claimed is:

1. A method for performing system power control within an electronic device, the method comprising the steps of:
when a power event occurs in a specific subsystem, wherein the electronic device comprises a plurality of subsystems, and the specific subsystem is one of the plurality of subsystems, utilizing a software programmable register (SPR) to record a power consumption of the power event;
utilizing a power consumption index generator positioned in the specific subsystem to generate a power consumption index corresponding to the power consumption of the power event; and
triggering a power limiter protection operation for the electronic device according to the power consumption index;
wherein the SPR records the power consumption of the power event according to a specific model, the electronic device can adaptively adjust coefficients and/or parameters of the specific model, and the SPR stores weightings of power respectively consumed by a plurality of predefined power events, wherein the power event is one of the plurality of predefined power events.

2. The method of claim 1, wherein the power consumption index corresponding to the specific subsystem represents a power consumption value of the specific subsystem; and the method further comprises:
comparing the power consumption value of the specific subsystem with a peak power threshold to determine whether the power consumed by the specific subsystem reaches the peak power threshold to generate a determining result; and
triggering the power limiter protection operation for the electronic device according to the determining result.

3. The method of claim 1, wherein the power limiter protection operation for the electronic device comprises:
reducing an operational frequency of at least one component within the electronic device for a predetermined time period by hardware-masking a clock signal supplied to the at least one component.

4. The method of claim 1, wherein the power limiter protection operation for the electronic device comprises:
reducing an operational frequency of at least one component within the electronic device for a predetermined time period by performing dynamic frequency scaling on a clock signal supplied to the at least one component.

5. The method of claim 1, wherein the power limiter protection operation for the electronic device comprises:
reducing a supply voltage supplied to at least one component within the electronic device for a predetermined time period by performing dynamic voltage scaling on the supply voltage.

6. The method of claim 1, wherein the power limiter protection operation for the electronic device comprises:
delaying a power-on request and/or a clock-on request from a non-critical component within the electronic device according to the power consumption index; and/or
delaying a power-on request and/or a clock-on request from a non-critical application installed on the electronic device according to the power consumption index.

7. The method of claim 1, further comprising:
utilizing another power consumption index generator positioned in another subsystem to generate another power consumption index corresponding to the other subsystem, wherein the other subsystem is another of the plurality of subsystems;
determining whether power consumed by the specific subsystem reaches a peak power threshold according to the power consumption index corresponding to the specific subsystem and according to the other power consumption index corresponding to the other subsystem to generate a determining result; and
triggering the power limiter protection operation for the electronic device according to the determining result.

8. The method of claim 1, further comprising:
raising an interrupt request (IRQ) according to the power consumption index, to trigger the power limiter protection operation for the electronic device.

9. The method of claim 1, further comprising:
asserting a specific signal according to the power consumption index, to trigger the power limiter protection operation for the electronic device.

10. An apparatus for performing system power control within an electronic device, the electronic device comprising a plurality of subsystems, the apparatus comprising:
at least a software programmable register (SPR) for recording a power consumption of a power event which occurs in a specific subsystem;
a power consumption index generator, positioned in the specific subsystem of the plurality of subsystems, for generating a power consumption index corresponding to the recorded power consumption of the power event; and
a processing circuit, coupled to the power consumption index generator, for triggering a power limiter protection operation for the electronic device according to the power consumption index;
wherein the SPR records the power consumption of the power event according to a specific model, the processing device can adaptively adjust coefficients and/or parameters of the specific model, and the SPR stores weightings of power respectively consumed by a plurality of predefined power events, wherein the power event is one of the plurality of predefined power events.

11. The apparatus of claim 10, wherein the power consumption index corresponding to the specific subsystem represents a power consumption value of the specific subsystem; and the processing circuit compares the power consumption value of the specific subsystem with a peak power threshold to determine whether the power consumed by the specific subsystem reaches the peak power threshold to generate a determining result, and triggers the power limiter protection operation for the electronic device according to the determining result.

12. The apparatus of claim 10, wherein during the power limiter protection operation for the electronic device, the processing circuit reduces an operational frequency of at least one component within the electronic device for a predetermined time period by hardware-masking a clock signal supplied to the at least one component.

13. The apparatus of claim 10, wherein during the power limiter protection operation for the electronic device, the processing circuit reduces an operational frequency of at least one component within the electronic device for a predetermined time period by performing dynamic frequency scaling on a clock signal supplied to the at least one component.

14. The apparatus of claim 10, wherein during the power limiter protection operation for the electronic device, the processing circuit reduces a supply voltage supplied to at least one component within the electronic device for a predetermined time period by performing dynamic voltage scaling on the supply voltage.

15. The apparatus of claim 10, wherein during the power limiter protection operation for the electronic device, the processing circuit delays a power-on request and/or a clock-on request from a non-critical component within the electronic device according to the power consumption index; and/or the processing circuit delays a power-on request and/or a clock-on request from a non-critical application installed on the electronic device according to the power consumption index.

16. The apparatus of claim 10, wherein the processing circuit utilizes another power consumption index generator positioned in another subsystem to generate another power consumption index corresponding to the other subsystem, wherein the other subsystem is another of the plurality of subsystems; and the processing circuit determines whether power consumed by the specific subsystem reaches a peak power threshold according to the power consumption index corresponding to the specific subsystem and according to the other power consumption index corresponding to the other subsystem to generate a determining result, and triggers the power limiter protection operation for the electronic device according to the determining result.

17. The apparatus of claim 10, wherein the processing circuit raises an interrupt request (IRQ) according to the power consumption index, to trigger the power limiter protection operation for the electronic device.

18. The apparatus of claim 10, wherein the processing circuit asserts a specific signal according to the power consumption index, to trigger the power limiter protection operation for the electronic device.

* * * * *